Sept. 15, 1925.
E. R. SCHROEDER
FASTENING DEVICE
Filed Jan. 19, 1924
1,554,040
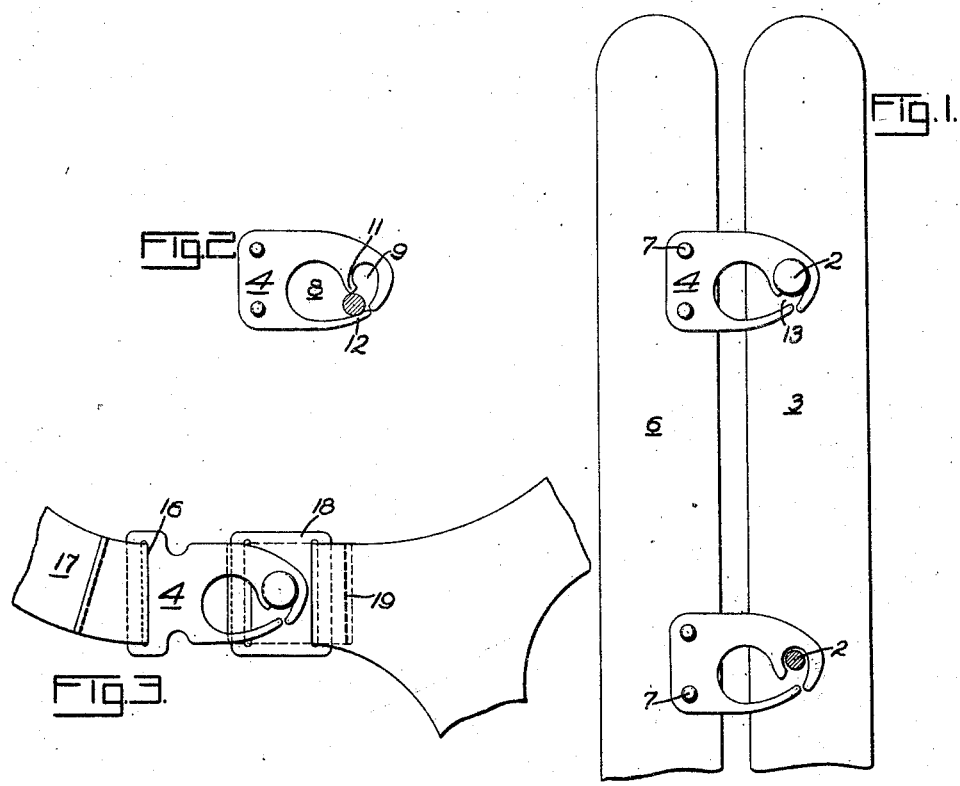
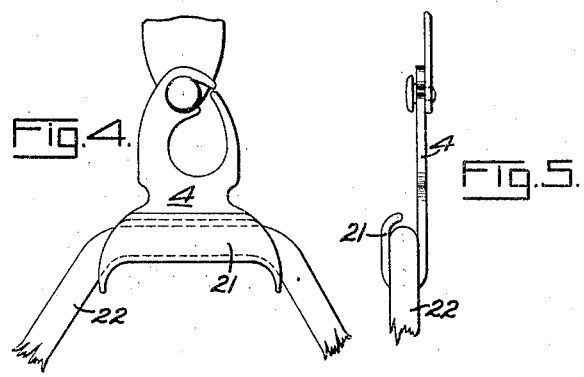
Inventor
ERNST R. SCHROEDER.
By White Prost & Evans
His Attorneys
WITNESS.
Louis Stevens.

Patented Sept. 15, 1925.

1,554,040

UNITED STATES PATENT OFFICE.

ERNST R. SCHROEDER, OF ALAMEDA, CALIFORNIA.

FASTENING DEVICE.

Application filed January 19, 1924. Serial No. 687,211.

*To all whom it may concern:*

Be it known that I, ERNST R. SCHROEDER, a citizen of the United States, and a resident of Alameda, county of Alameda, and State of California, have invented a new and useful Fastening Device, of which the following is a specification.

My invention relates to readily releasable fasteners, and an object of the invention is to provide a fastening device adapted for use in corsets, elastic belts, suspenders, and similar articles, which while retaining the quality of being readily disengaged, is characterized by a security which renders accidental loosening unlikely.

My invention possesses other objects and features of advantage, some of which, with the foregoing, will be set forth in the following description of my invention. It is to be understood that I do not limit myself to the showing made by the said description, as I may adopt variant forms of my invention within the scope of the claim.

Referring to the drawings:

Figure 1 is an elevation showing a portion of two corset steels provided with my fastening device.

Figure 2 is a plan view of my fastener, showing the stud in the neck of the aperture.

Figure 3 is an elevation showing my fastening device as applied to a garter.

Figure 4 is an elevation showing my fastening device adapted for use on a suspender.

Figure 5 is a side elevation of the device shown in Figure 4.

Broadly considered my invention comprises a headed stud adapted to be secured in any desired manner on one element of the thing to be fastened, and a plate adapted to be secured to the other element of the thing to be fastened, and apertured so as to engage the stud. Means are provided for resiliently resisting disengagement of the stud from the plate.

In detail, my invention comprises a headed stud 2 mounted in any suitable manner on one element of the thing to be fastened, as for example a corset steel 3, as shown in Figure 1; and a plate 4 which is secured to the companion steel 6 by suitable rivets 7. The plate 4 is provided with an elongated aperture, the inner end 8 having a diameter greater than the diameter of the stud head, to permit the plate to be hooked over the stud, and the outer end 9 of the aperture having a diameter smaller than the stud head, so that the stud having engaged the smaller end of the aperture cannot be disengaged except by being passed backwardly into the larger end of the aperture.

Projecting into the aperture adjacent the smaller end is a horn 11 which extends past the line of movement which the stud would tend normally to take in unfastening the device, so that release of the stud from the plate by ordinary movements of the body or garments is prevented, and can be achieved only by a circuitous movement around the horn. Thus the horn receives the direct thrust occasioned by ordinary movement of the body and prevents the stud from passing directly from the smaller end of the aperture into the larger end of the aperture. The circuitous movement of the stud about the horn is resisted by a resilient arm 12 which preferably is integral with the plate and bounds one side of the aperture, its free end extending into the aperture opposite the horn 11, so as to provide a passage 13 between the aperture ends 8 and 9, which is slightly smaller than the diameter of the stud. Since this arm is springlike, it offers a resilient resistance to any movement of the stud to and from the smaller end of the aperture.

To fasten my device the stud is inserted in the larger aperture 8 and moved forwardly toward the passage 13. At this point it is necessary to exert slight pressure against the resilient arm 12 to force it backwardly sufficiently to permit the passage of the stud. When the stud has passed the end of the arm, the arm springs back into its normal position thus locking the stud in the smaller aperture 9.

With the usual form of fastening device, ordinary movement of the body frequently disengages the stud. With my device such movement merely presses the stud backwardly against the horn 11 which prevents its further backward movement or against the spring arm 12 which resiliently resists any movement into the passage 13. The stud may be readily disengaged from the aperture by forcing it against the resilient arm which springs backwardly, widening the passage 13 sufficiently to permit its passage. The movement required to force the spring arm backwardly is one which cannot be unconsciously imparted so that accidental unfastening of my device is impossible.

In Figure 3 I have shown my fastening device applied to a garter. The plate 4 instead of being secured by rivets is provided with a slot 16 into which the elastic band 17 of the garter may be secured in the usual way. The stud may be mounted on any suitable base 18 which is provided with slots to receive the other end of the elastic, which may then be doubled back and fastened by stitches 19.

Figures 4 and 5 show the fastening device adapted for use on suspenders. When used for this purpose the plate 4 is prolonged at its inner end and bent to form a hook 21, providing a channel thru which the cord 22 of the suspenders is passed.

While the above description has been directed to the use of my fastening device with a corset, garters or a suspender, it is quite obvious that it may be applied with equal advantage to an elastic belt or similar surgical appliances. It is of course obvious that in a corset, belt or waist as many of the fastening devices may be used as the length of the edge strips makes desirable.

I claim:

A fastening device comprising a headed stud, a plate formed with an aperture adapted at one end to permit the entrance and exit of the headed stud and adapted at the other end to lock the headed stud in the plate, a rigid horn dividing the two portions of the aperture and bounding one side of a passage narrower than the width of the head of the stud and thru which passage the stud moves to and from the locking end of the aperture, and a resilient arm integral with and forming a portion of the outer edge of said plate for resisting movement of the stud to and from the locking portion of the aperture.

In testimony whereof, I have hereunto set my hand.

ERNST R. SCHROEDER.